J. SKARZYNSKI.
TRAP.
APPLICATION FILED JUNE 5, 1920.
1,392,666.
Patented Oct. 4, 1921.
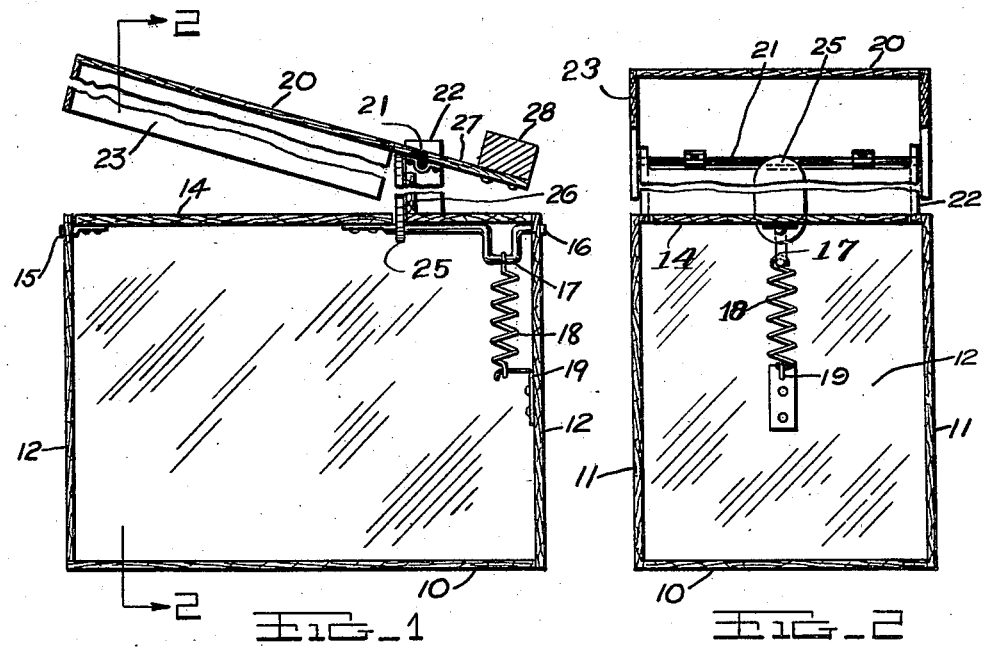
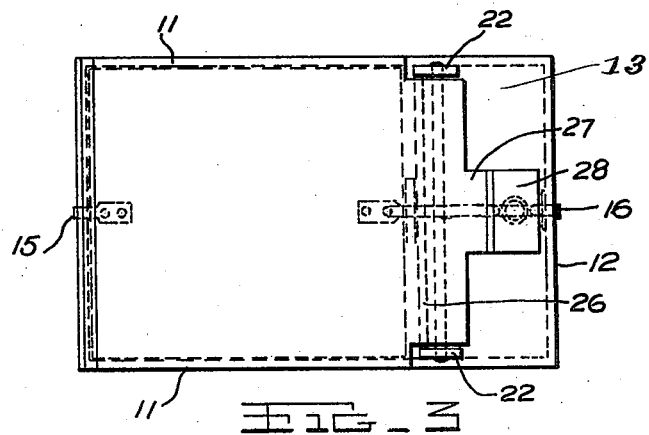
INVENTOR.
John Skarzynski
BY
George C. Heinrich
ATTORNEY.

UNITED STATES PATENT OFFICE.

JOHN SKARZYNSKI, OF SOUTH AMBOY, NEW JERSEY, ASSIGNOR OF ONE-HALF TO JOHN SMOLIENSKI, OF SOUTH AMBOY, NEW JERSEY.

TRAP.

1,392,666.  Specification of Letters Patent.  Patented Oct. 4, 1921.

Application filed June 5, 1920. Serial No. 386,667.

*To all whom it may concern:*

Be it known that I, JOHN SKARZYNSKI, a citizen of Poland, residing at South Amboy, county of Middlesex, and State of New Jersey, have invented certain new and useful Improvements in Traps, of which the following is a specification.

This invention relates to traps intended more particularly for use in catching mice or rates and it has for an object to provide a simple and inexpensive trap which will operate efficiently and which will not be liable to get out of order.

For further comprehension of the invention, and of the objects and advantages thereof, reference will be had to the following description and accompanying drawings, and to the appended claims in which the various novel features of the invention are more particularly set forth.

Figure 1 of the drawings is a longitudinal vertical section of a trap constructed according to my invention, the cover and its flange and several other parts being shown broken.

Fig. 2 is a transverse section on the line 2—2 of Fig. 1, several parts being shown broken.

Fig. 3 is a plan view of the trap, the cover being shown broken.

As here shown my improved trap comprises an oblong rectangular box having a bottom 10, side walls 11, and end walls 12, the top of the box being formed by a relatively short fixed top plate 13 and a hinged trap door 14 in front thereof which extends from the front of the box about two-thirds of the length thereof. This trap door 14 is hinged midway between opposite sides thereof by means of hinge pintles 15 and 16 fixed to opposite ends thereof and bearing in the end walls of the box, the rear pintle 16 extending under the fixed top plate 13. This pintle 16 has a cranked portion 17 which extends vertically downward when the door is in its horizontal or closed position and has attached thereto the upper end of a tension spring 18 whose lower end is fixed to a hook 19 on the rear wall of the box, this spring holding the trap door on its horizontal position.

Arranged above this trap door is a hinged cover member adapted to work automatically in unison with the trap door inversely thereto, closing downward as the trap door swings open and opening upward as the trap door closes, maintaining its raised or opened position as long as the trap door is closed. This cover is shown at 20 and is hinged at its rear end on a rod 21 extending transversely of the box and supported at a distance above the top plate 13 in brackets 22 projecting upward at the sides of the box, this cover having a depending flange 23 extending around the front and sides thereof.

This cover 20 is normally held in a position inclining upwardly from the hinge end thereof by means of an oval cam 25 which is fixed on the rear pintle 16 adjacent the trap door 14, and engages the cover 20 a short distance in, in front of its hinge rod 21, the door being spaced at its rear end from the plate a sufficient distance to accommodate the cam, the cam being so arranged on pintle 16 as to assume its upright or operative position when the trap door 14 is horizontal. The top plate may have an upstanding flange 26 extending along its front edge between the brackets 22.

In order to reduce to a minimum the force necessary to swing the cover 20 upwardly to open position the latter is provided with a rearward extension 27 on which is mounted a counterweight 28, which balances the greater part of the weight of the door.

In the use of the trap a suitable bait is placed on the trap door 14 at the rear end thereof. When the animal walks on the trap door in the endeavor to reach the bait the door swings to one side or the other and the animal falls into the box. As the door swings the cam 25 moves away from the cover and the latter closes down. When the door 14 swings back to its closed position under the tension of spring 18 the cam 25 engages the cover and raises the other.

Having thus described my invention what I claim as new and desire to secure by Letters Patent of the United States is—

1. An animal trap comprising a box, a trap door hinged in the top of said box, means yieldingly holding said trap door in closed position, and a cover above said trap door adapted to operate in unison with said trap door inversely thereto.

2. An animal trap comprising a box, a trap door hinged in the top of said box resilient means holding said trap door in closed position, a cover above said trap door, and means carried by said door adapted to raise and support said cover as the door swings to closed position.

3. An animal trap comprising a box, a trap door hinged in the top of said box resilient means holding said trap door in closed position, a cover above said trap door, and means carried by said door adapted to raise and support said cover as the door swings to closed position, said means comprising a cam fixed to the hinge pintles of the door.

4. An animal trap comprising a box, a trap door hinged in the top of said box, midway between its sides, a spring holding said trap door in closed position, a cover hinged above said trap door transversely thereto, a cam upon the hinge pintles of the trap door adapted to raise and support said cover, and a counterweight partly balancing said cover.

5. An animal trap comprising a box, a trap door hinged in the top of said box midway between its sides, one of the hinge pintles of the trap door having a cranked portion disposed at right angles to the door, a tension spring connected to said cranked portion of the hinge pintle, a cover hinged transversely to the trap door at the end thereof to which is secured the said pintle and disposed at a distance above the said trap door, a depending flange extending around the free end and the two sides of said cover, a cam upon the said pintle adapted to support said cover in a position inclining upwardly from its hinge end, and a counterweight partially balancing the said cover.

In testimony whereof I have affixed my signature.

JOHN SKARZYNSKI.